United States Patent

[11] 3,530,816

| [72] | Inventor | Herman Mitchell<br>Los Angeles, California (8983 Greenbush Ave., Arleta Calif. 91331) |
|---|---|---|
| [21] | Appl. No. | 746,161 |
| [22] | Filed | July 19, 1968 |
| [45] | Patented | Sept. 29, 1970 |

[54] POWER BOAT STABILIZING APPARATUS
12 Claims, 10 Drawing Figs.

| [52] | U.S. Cl. | 114/66.5 |
|---|---|---|
| [51] | Int. Cl. | B63b 1/18 |
| [50] | Field of Search | 114/66.5P |

[56] References Cited
UNITED STATES PATENTS

| 1,265,035 | 5/1918 | Bazaine | 114/66.5 |
|---|---|---|---|
| 2,807,228 | 9/1957 | Vandre | 114/66.5 |
| 3,046,928 | 7/1962 | Sherrill | 114/145X |

Primary Examiner—Andrew H. Farrell
Attorney—Roger A. Marrs

ABSTRACT: The stabilizing apparatus disclosed herein provides trim control plates hingeably mounted on the transom of a power boat so as to introduce an impact surface of the plates to the pressure of oncoming water. A high initial effort leaf spring is pivotally connected at its opposite ends to the transom and the free end of the plates, respectively, which normally urges the plates towards an angular position below the horizontal and which is adapted to yield suddenly under a specific increase of water impact loads to permit each plate to assume angular positions closer to the horizontal.

HERMAN MITCHELL
INVENTOR.

BY Roger G. Marrs

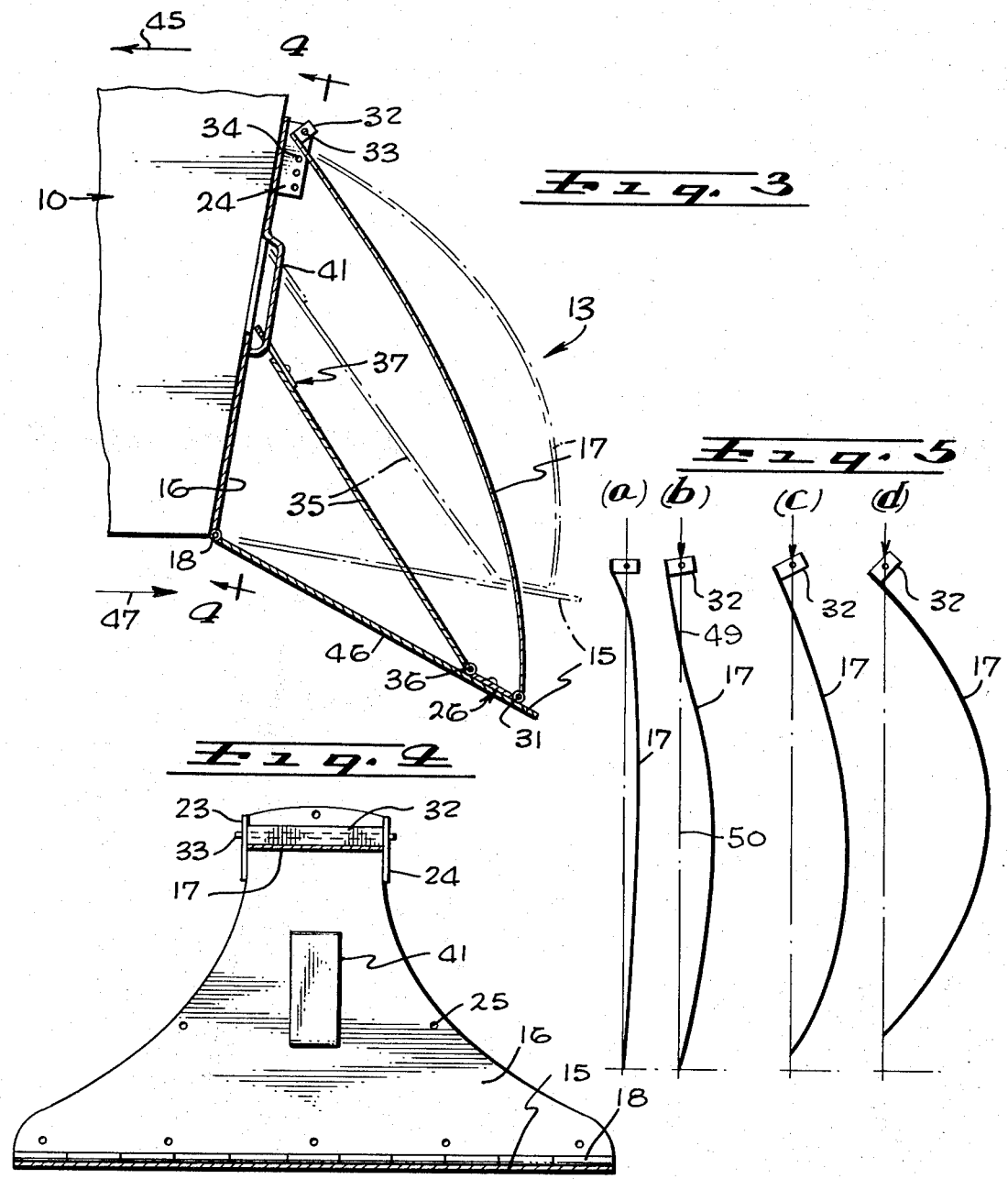

POWER BOAT STABILIZING APPARATUS

BACKGROUND OF THE INVENTION

1. Field of the Invention

The present invention relates to marine vehicles having stabilizing units and, more particularly, to a novel stabilizing apparatus incorporating a deformable leaf spring adapted to be flexed under the impact of oncoming water pressure to automatically position control plates so as to be effective for stabilizing the vehicle as it travels in the water.

2. Description of the Prior Art

Marine vehicles are designed and constructed to operate in various planing modes such as a low speed mode wherein the vehicle is supported in the water by its basic hull having its bottom completely wetted, a high speed mode wherein the vehicle is supported on the water by the stern portion of the hull bottom which is wetted, and a transition mode wherein the vehicle may be supported by various degrees of wetted bottom between the stern and the bow.

Conventional planing vehicles have little difficulty in attaining high speed operation in smooth water. However, when waves are encountered, the vertical accelerations and wave impacts experienced necessitate a drastic reduction in speed. For example, the passenger in a conventional marine vehicle operating in heavy seas experiences such a rough ride that the operator must resort to the low speed mode of operation. During the high speed operation, the variations in the water surface cause lift fluctuations which result, in turn, in changes in the amount of wetted bottom area of the vehicle. Hence, the extent of the wetted bottom area bears a direct relation to planing lift and operating efficiency of the vehicle throughout its various modes of operation. The problems of maximizing planing lift and operating efficiency in power boats is increased by inability to adjust the forward and rearward angle of the keel with respect to the horizontal so that the hull tends to bump from one wave to another.

This problem has received a great deal of attention and numerous attempts have been provided for mounting trim tab controls at the stern or the transom of the boat. Unfortunately, these prior attempts to adjust the forward and rearward angle of the keel with respect to the horizontal fail to maintain the desired changes under conditions of speed, total load, distribution of load, weight, water current and the like. Lifting force under the rear of the vehicle is developed by a combination of forward speed of the vehicle and pitch angle of the trim control tabs. At slower speeds, the pitch angle below the horizontal should be greater, and at higher speeds, the pitch below the horizontal should be less.

Some of the prior art devices have tried to establish and preset the pitch angle of the control trim tabs and, if correctly established for a given set of operating conditions, an incorrect pitch angle is maintained for other conditions. Such prior art devices are represented by the fixed or non-variable devices disclosed in U.S. Letters Pat. Nos. 2,816,521 and 3,111,103.

Other prior art devices have attempted to provide for adjustable change in pitch angle by either mechanical adjustment of the pitch angle or, adjustment by means of electrical means or gas cylinder control. Representative of the latter device is disclosed in U.S. Letters Pat. No. 3,177,837. These devices depend upon the operator of the boat to make frequent and correct adjustments as conditions change, and disastrous results may be caused if the operator, through inexperience, carelessness or concentration of attention on other factors of operation of the boat, makes an incorrect adjustment or fails to make a required adjustment. Furthermore, such constant manual adjustment devices require extensive equipment to make the adjustments which are subject to malfunction and failure if the source of power, such as electricity, compressed gas or the like, should fail.

Still another category of prior art devices resides in employing a helical spring regulator for automatically adjusting the pitch angle of the control tabs to agree with different vehicle operating conditions. Such a regulator is disclosed in U.S. Letters Pat. No. 3,200,782 which discloses such a helical spring having a closure curve of spring rate which does not follow a straight line as directed by Hooke's Law, but employs a progressive closure rate. The device disclosed employs a variable pitch helical compression spring which, in itself, is well known in the prior art so that as the spring compresses, more and more of its turns will reach solid height leaving fewer effective turns. However, it is to be noted that this conventional spring, although of a progressive type, cannot be considered a high inertial energy spring since its rate of closure is constant at the variable rate and does not change its rate of closure according to proportional variations as a direct result of impact loads. Consequently, although the control plates or tabs are automatically set, the placement of the control plates may not necessarily be at the optimum operating efficient mode for the marine vehicle at any given set of operating conditions.

Furthermore, prior art automatic or self-locating trim tabs incorporating progressive springs cause excessive resistance by being located down below the horizontal while the vehicle is in its low speed mode. As the vehicle gains speed, the control trim tabs gradually rise under the oncoming pressure of water impinging against the under surface thereof so that the tab cannot remain down at the optimum angle until the vehicle commences to plane. As the boat planes and continues to gain speed, the tabs will change angles accordingly because of the yielding progressive rate spring and will not remain at a desired set position which would be the most advantageous to the boat at that particular transition period. Conventional trim tabs cannot operate efficiently because the tabs do not have set or positive angles. The spring cannot maintain the tabs in a given set position as the spring is intended to progressively yield.

SUMMARY OF THE INVENTION

Accordingly, the above difficulties and problems are obviated by the present invention which comprises trim control plates hingeably carried on the stern transom of a power boat so as to present an impact surface carried on the plates to the pressure of oncoming water as the boat travels therethrough. A high initial effort or high inertial energy leaf spring is pivotally connected at its opposite ends between the transom and the free end of the plates for normally urging the plates toward an angular position below the horizontal. The leaf spring is adapted to yield under a specific and predetermined increase of water impact loads to permit the plates to assume angular positions closer to the horizontal.

By employing a deformable leaf spring, the curve of spring rate closure will not follow a straight line as dictated by Hooke's Law. The leaf spring presents a variable resistance to the movement of the control plate as it pivots towards the transom with greatest resistance by far being present where the leaf spring is fully extended in its flat configuration. Thereafter, the leaf spring will bend or deform more easily until the bend in the spring assumes a maximum distortion under control of a stop bracket which will prevent further advancement of the control plate toward the transom.

Therefore, it is among the primary objects of the present invention to provide a self-biasing stabilizing plate for marine vehicles adapted to automatically adjust the angle of such a plate toward the horizontal by providing a controlled bias thereto.

Another object of the present invention is to provide a novel stabilizing apparatus for marine vehicles employing a deformable leaf spring means which will decrease the resistance to deflect as angular change of the control plates takes place toward the horizontal at a much steeper rate than a linear rate provided by conventional spring devices.

Yet another object of the present invention is to provide a novel spring biasing system for marine vehicle control plates adapted to be responsive to primarily a particular boat speed by deforming in an inverse proportionate manner.

Still a further object of the present invention is to provide a marine vehicle having a wetted area which is less sensitive to wave slamming forces than are those of conventional vehicles, thereby avoiding significant changes in wetted area and permitting the maintenance of high speed in a seaway.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 3 is a cross-sectional view of the stabilizing apparatus illustrated in FIG. 1 as taken in the direction of arrows 3–3 thereof;

FIG. 4 is a cross-sectional view of the stabilizing apparatus as taken in the direction of arrows 4–4 of FIG. 3;

FIGS. 5a—5d are side elevational views of the high initial effort leaf spring employed in the stabilizing apparatus illustrating three flexed positions of deformation; and FIGS. 6 and 7 are side elevational views of another embodiment of the stabilizing apparatus invention having modified leverage means for flexing the leaf spring thereof.

BRIEF DESCRIPTION OF THE PREFERRED EMBODIMENT

Figure 1:
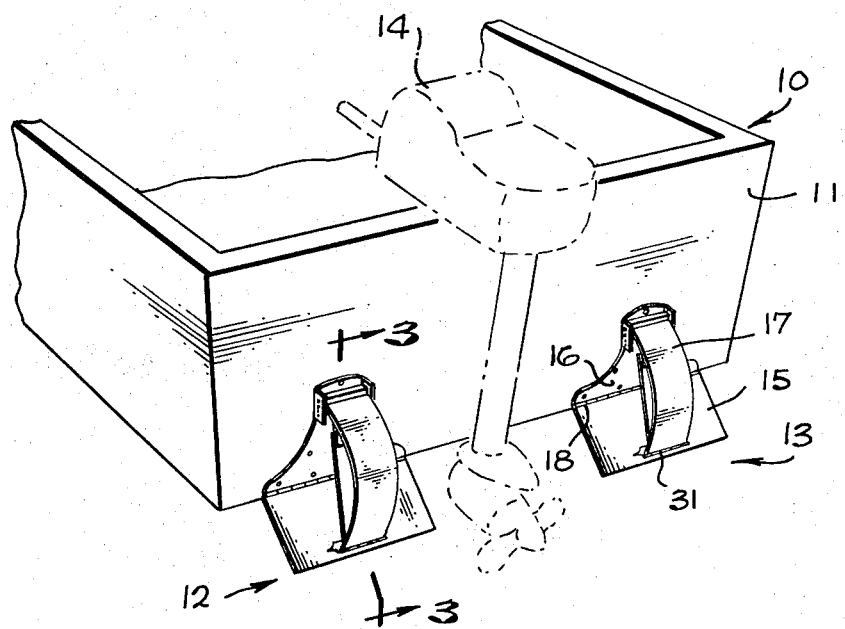
FIG. 1 is a perspective view of the novel stabilizing apparatus of the present invention illustrated in operating position on the transom of a typical power boat.

Referring to FIG. 1, the stabilizing apparatus of the present invention is illustrated in connection with a boat 10 having a stern transom 11 on which is mounted a pair of control tab units indicated in the direction of arrows 12 and 13, respectively. The units are arranged on opposite sides of the boat center line so that they are arranged in fixed spaced apart relationship. By this arrangement, a conventional outboard power means 14 may be readily mounted on the stern of the boat and extended between the two units 12 and 13 on the center line of the boat.

Each control trim unit includes a pressure plate 15, a mounting backplate 16 adapted to be secured to the transom 11, and a high initial effort leaf spring member 17. The broad, flat spring 17 has its opposite ends pivotally attached between the free end of each plate 16 and pressure plate 15, respectively, so that each pressure plate is normally urged downwardly below horizontal defined by the bottom of boat 10. The adjacent ends of plates 15 and 16 are joined by a hinge connection 18 generally coinciding at the location where the transom joins the bottom of the boat.

Figure 2:
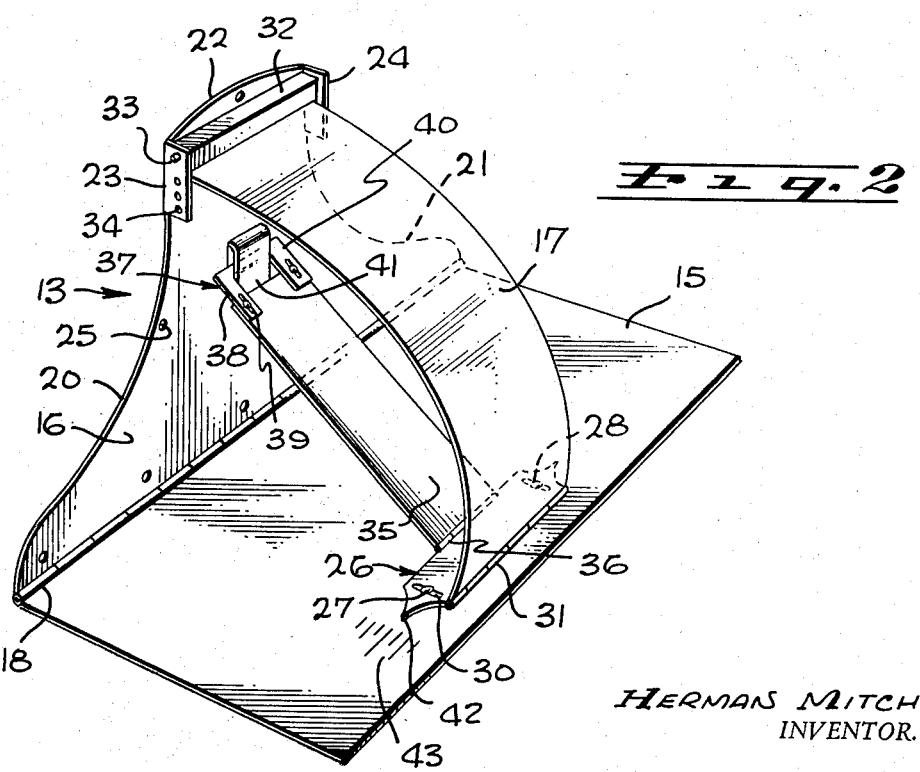
FIG. 2 is an enlarged perspective view of the stabilizing apparatus shown in FIG. 1.

Referring now in detail to FIG. 2, it can be seen that the backplate 16 includes inwardly curved side edges 20 and 21 which extend upwardly from the opposite ends of hinge 18 to terminate in a central portion 22 formed with opposite flanges 23 and 24. The backplate 16 is held in place against the transom by means of suitable fasteners which are inserted through a plurality of holes, such as hole 25, formed therein.

An adjusting plate 26 is mounted on the top surface of pressure plate 15 by means of fasteners 27 and 28 which pass through elongated slots 30 into securement with the pressure plate. The adjusting plate has a fore and aft movement and one end of the spring 17 is carried by the adjusting plate by means of a hinge 31. The end of spring 17 opposite to its end carried by adjustment plate 26 terminates in securement with an offset pivot 32 having opposite pins 33 pivotally mounted in mating holes, such as hole 34, formed in the pair of flanges 23 and 24. It is to be noted that the flanges 23 and 24 are each provided with a row of holes 34 which are aligned horizontally so as to selectively receive the pins 33 carried on the offset pivot 32. The adjusting holes 34 are employed to permit adjustment during mounting of the backplate 16 for different transom angles employed by a variety of boat designs.

Another adjustment feature is performed by a stop bracket 35. The lower portion of the bracket 35 is hinged to the forward edge of the adjusting plate 26 by means of hinge connector 36. The upper portion of the bracket carries a U-shaped member 37 having leg portions 38 and 40 slotted so as to receive fasteners for securement to the bracket 35. The central portion of the U-shaped member is captured behind a pressed-out section 41 formed in the backplate 16. When the U-shaped member is fastened to the bracket 35, the upper portion of the bracket can slide vertically within the limits of the pressed-out section 41. Upward movement is limited when the U-shaped member engages with the upper edge of the pressed-out section.

It is to be noted that the adjusting plate 26 includes a pointer 42 formed on each of its opposite ends which is adapted to register or index with selected locations defined by scale markings 43. This adjustment may be readily made by loosening the screw fasteners 27 and 28 so that the adjusting plate 26 may be positioned to a preselected position determined by the scale so as to adjust the leverage of spring 17 to apply suitable bias to the pressure plate 15. This adjustment may be made depending upon various factors of boat design, characteristics and operating efficiencies desired by the operator.

Referring now in detail to FIGS. 3 and 4, the control trim tabs, such as unit 13, are fastened to the transom 11 of the boat which is traveling in the direction of arrow 45 so that the water will impinge against an impact surface 46 carried on the bottom of pressure plate 15. The pressure plate 15 is angled downwardly so that it is submerged in the water below a horizontal line contiguous with the bottom of the boat 10. Therefore, it can be seen that on-coming water indicated by arrow 47 will impinge or strike the impact surface 46 as the boat moves in the direction of arrow 45. The angle at which the pressure plate 15 is downwardly depressed is adjustable by means of the holes 34 for retaining the offset pivot 32. Preferably, it has been found that the deflection angle of the pressure plate will be most successful within the range of 20 – 30° below the horizontal.

As the on-coming water strikes the pressure plate, the resultant force tends to urge the pressure plate upward about hinge 18. However, inasmuch as the plate is fixed to the boat and held in place by the high inertial energy spring 17, the upward pivoting force will raise the stern of the boat to a more level position with reference to the bow of the boat. Maintaining the bow of the boat relatively level with the stern will enable the boat to travel faster not only through the water but substantially on top of the water so that operating efficiencies are derived.

Once the boat equipped with the control trim units having pressure plates 15 in their downward angle has started to plane, then the spring 17 commences to bend sharply and permits the plates 15 to pivot about hinge 18 upwardly to a location shown in broken lines. The spring of each unit can now accurately set and will not bend until the boat has reached its full planing speed. Obviously, the faster the boat travels, the faster the water will strike the plates and the greater will be the force exerted on the impact surface of each pressure plate 15 to raise the pressure plate.

Once the boat is planing, then the pressure plates 15 will rise to just beneath a horizontal line with reference to the bottom of the boat and no appreciable water resistance is encountered. The boat will rise rapidly during the transition mode to the full planing mode due to the offset pivot principle of the high initial effort spring.

The rate at which each plate 15 will rise is controlled by its respective adjusting plate 26. By setting the adjusting plate forward, in the direction of hinge 18, the plate 15 leverage is increased so that the spring 17 extends between its opposite ends having the same curved configuration such as is shown in solid lines. By moving the adjusting plate rearwardly, the pressure plate leverage is decreased so as to relatively strengthen the spring 17 and the boat is required to travel faster in order to bend the spring and raise the plate. The maximum bend of spring 17 is shown in broken lines when limited by the stop bracket. The inscribed scale lines 43 on the top surface of each pressure plate indicates various speeds at which the plate will snap upwardly. Also, each end of the adjusting plate is formed with a pointer 42 so as to more precisely index or register with selected lines of the scale 43.

Normally, a relatively high percentage of marine vehicles are stern-heavy due to the placement of the heavy power plants at the stern of the hull. Also, many boats have heavy fuel tanks carried near the stern. These stern-heavy boats, even while travelling fast and planing, will have a tendency to ride with their bows relatively high which has the adverse effect of reducing visibility, comfort and economy. Therefore, the device of the present invention incorporates a second adjustment in the control trim tab plate. The second adjustment involves stop bracket 35 which will stop or limit the upward travel of the plate 15 after the boat has started to plane during the transition mode and the spring 17 has deformed so as to allow the plate to move upwardly. The bracket 35 is hinged to the forward edge of the adjusting plate by hinge connection 36 so that the end of the bracket is anchored securely to plate 15. The other end of bracket 35 is slidably connected behind the pressed-out section 41 in the backplate 16 and is provided with limited vertical movement by the upper and lower ends of the pressed-out portion 41. U-shaped member 37 includes mounting slots 39 and 40 which enable the bracket 35 to be lengthened or shortened. The bracket 35 is relatively rigid and inflexible. By adjusting the length of the bracket 35, the upward travel of the plate 15 can be limited to any degree of inclination with the horizontal boat bottom line. The upward travel of plate 15 will stop when the top of the bracket 35 engages against the upper edge of the retaining brace 41. Therefore, for boats which have a poor planing angle, setting the plate 15 to stop at a predetermined angle below the horizontal, provides an accurate adjustment for maximizing operational efficiency. This accurate second setting will remain fixed regardless of how fast the boat is travelling. Due to the fact that the adjustment is set for a relatively small amount, the plate will extend at an angle for a small distance below the horizontal so that it will cause only a minimum amount of resistance to the on-rushing water. The boat's overall speed as well as economy and comfort will be increased thereby. Naturally, when the boat slows to below planing speed or stops, the entire control trim tab plate resets itself automatically because of the bias of resilient spring 17.

The high initial effort spring 17 is a broad, flat leaf spring with a permanent or natural convex curve on the side of the offset pivot such as is shown in FIG. 5a. The upper end of the spring is secured to offset hinge 32. When pressure or force is exerted at each end, as shown in FIG. 5b, through the line 50 at the pressure plate end, the offset pivot 32 causes the following effects. The pressure from the top of the spring causes, due to its leverage, a portion of the spring immediately below or adjacent to the offset pivot at numeral 49 to bend inwardly and against the natural spring curve. This same pressure will attempt to cause the natural spring curve to increase its natural arc. Two opposite bends are now present in the same spring working against each other causing the spring to become relatively more unyielding. As the force or pressure at the opposite ends increases, the two opposite arcs increase as the original arc increases more so as to eventually cause the second arc 49 to diminish so that the spring 17 will snap and assume the curvature shown in FIG. 5c. As the spring is further compressed past its original snap or major bend, the force required to further bend the spring 17 will become less. FIG. 5b shows the line of force intersecting the spring. FIG. 5c shows the line of force intersecting the spring at a different location across the portion of the spring adjacent the hinge connection 32. The greater the curve of the spring, the closer to the end the line of force travels having the effect of lengthening the spring and less and less effort is required to compress it. The pressure differential to cause the spring to originally snap as against the pressure required to continue to bend it can be regulated or adjusted by the size, shape, thickness, material, temper, natural curvature and placement of the offset pivot point and the pivot placement of the opposite end.

Referring now in detail to FIGS. 6 and 7, another embodiment of the present invention is illustrated which provides a leverage means for improving the bending movements of the leaf spring 17. The leverage means includes an extension panel 55 pivoted at one end to the lower end of spring 17 and pivoted about its midsection to the extreme end of pressure plate 15. By this construction, a portion of the panel extends beyond the pressure plate and substantially increases the angle of the pressure plate at its rear end below the horizontal. As shown in FIG. 6, the spring 17 and extension panel 55 are coextensive along the same plane so that the portion extending beyond pressure plate 15 is at a substantial angle below the horizontal as compared to the angle of pressure plate 15. It is to be noted that a brace 56 has one end fixed on the opposite side of extension panel 55 midway between its opposite end and has its opposite end pivotally connected to the free end of a cantilevered member 57. The opposite end of member 57 is fixed to the lower end of spring 17 adjacent its hingeable connection to the extension panel.

Therefore, it can be seen that the on-coming water will impinge against pressure plate 15 and the underside of the portion of the extension panel 55 during the slow speed mode and transition of boat operation. However, as shown in FIG. 7, when slow speed has substantially increased to its planing mode, the pressure exerted against extension panel 55 combines with the forces created by the water pressure impinging against the pressure panel 15 to bend the spring 17 via the leverage derived from the brace 56 and member 57.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Control apparatus for a power boat having a bottom adapted to extend in a substantially horizontal plane terminating at its aft end in an upright transom comprising:
    control plate means for controlling the angle of the power boat with respect to the horizontal;
    a back plate secured to the transom;
    hinge means pivotally connecting said plate means to said back plate substantially at the junction of the bottom with the transom; and
    a leaf spring resiliently disposed between the remote ends of said back plate and said plate means opposite to their ends connected by said hinge means so as to act against the boat transom and against said plate means urging the remote ends continuously apart and normally urging said plate means toward an angular position below the horizontal and yieldable under increase of load to permit said plate means to assume an angular position closer to the horizontal.

2. The invention as defined in claim 1 wherein said leaf spring is pivotally secured at its opposite ends to said back plate and to said plate means respectively.

3. The invention as defined in claim 2 wherein said securement of said leaf spring to said back plate is characterized by an offset pivot connection in which the pivot axis of rotation is offset from said securement.

4. The invention as defined in claim 2 wherein said leaf spring is characterized as a high inertial energy spring having an arcuate configuration in its expanded condition and an arcuate configuration in its loaded condition of lesser degrees than in its expanded condition.

5. The invention as defined in claim 2 including a brace member hingeably carried on one end by said plate means and loosely coupled to said back plate on its other end.

6. The invention as defined in claim 5 wherein said brace member is located between said leaf spring and said plate means.

7. The invention as defined in claim 1 including:
an adjustment plate carried on said control plate means;
said leaf spring having its opposite ends pivotally connected to said adjustment plate and said back plate respectively; and
means interconnecting said adjustment to said plate means for selectively moving said adjustment plate so as to selectively increase and decrease the bias of said leaf spring.

8. The invention as defined in claim 7 including:
a bracket member disposed between said adjustment plate and said back plate; and
one end of said bracket member being hingeably coupled to said adjustment plate and the other end being loosely connected to said back plate so as to permit limited vertical movement of said bracket member.

9. The invention as defined in claim 1 wherein:
said back plate includes a portion having outwardly extending spaced apart flanges;
each of said flanges having a row of holes formed therein wherein said holes of each row formed in said flanges are aligned in respective pairs;
offset pivot means carried in a selected pair of aligned holes between said flanges; and
means securing one end of said leaf spring to said pivot means.

10. In a control apparatus for power boats for:
improving the operating efficiency thereof;
a pair of control units mounted at the stern of the boat;
each of said control units having a pressure plate hingeably carried by a back plate so as to engage the water wherein said hinge connection is in alignment with the bottom of the boat;
a broad, flat leaf spring constituting a high initial effort spring interconnecting said back plate and said pressure plate whereby said pressure plate is biased into the water at an angle to the horizontal below the boat bottom; and
means operably connected between said back plate and said pressure plate for automatically limiting the extent of bias exerted by said spring against said pressure plate.

11. The invention as defined in claim 10 wherein said spring is stressed into an arcuate configuration and is adapted to flex in response to applied loads of on-coming water impinging against the undersurface of said pressure plate so as to apply more or less bias to said pressure plate.

12. The invention as defined in claim 10 wherein said spring is adapted to snap into alternate positions about a center line in response to varying loading conditions of said pressure plate.